(12) United States Patent
Knauth et al.

(10) Patent No.: US 8,682,701 B1
(45) Date of Patent: Mar. 25, 2014

(54) PROJECT PIPELINE MANAGEMENT SYSTEMS AND METHODS HAVING CAPITAL EXPENDITURE/EXPENSE FLIP TARGETING

(75) Inventors: Margaret J. Knauth, Overland, KS (US); Matthew E. Perkins, Pleasant Hill, MS (US); Debra L. Roberts, Flower Mound, TX (US); James L. Crum, Lenexa, KS (US); Janene A. Munkirs, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2268 days.

(21) Appl. No.: 11/403,701

(22) Filed: Apr. 13, 2006

(51) Int. Cl.
*G06Q 10/00* (2012.01)
*G06Q 10/06* (2012.01)

(52) U.S. Cl.
CPC ...................................... *G06Q 10/06* (2013.01)
USPC .......... 705/7.11; 705/7.12; 705/7.23; 705/30; 717/101

(58) Field of Classification Search
USPC .............. 705/7, 7.11, 7.12, 7.23, 30; 717/101
See application file for complete search history.

(56) References Cited

U.S. PATENT DOCUMENTS

| | | | |
|---|---|---|---|
| 5,408,663 A | 4/1995 | Miller | |
| 5,619,695 A | 4/1997 | Arbabi et al. | |
| 5,953,707 A | 9/1999 | Huang et al. | |
| 5,970,490 A | 10/1999 | Morgenstern | |
| 6,032,121 A | 2/2000 | Dietrich et al. | |
| 6,216,109 B1 | 4/2001 | Zweben et al. | |
| 6,519,763 B1 | 2/2003 | Kaufer et al. | |
| 6,678,671 B1 | 1/2004 | Petrovic et al. | |
| 6,687,677 B1 | 2/2004 | Barnard et al. | |
| 6,714,915 B1 | 3/2004 | Barnard et al. | |
| 6,993,533 B1 | 1/2006 | Barnes | |
| 7,080,024 B2 | 7/2006 | Thompson | |
| 7,089,193 B2 | 8/2006 | Newbold | |
| 7,139,720 B1 | 11/2006 | Foell et al. | |
| 7,139,999 B2 | 11/2006 | Bowman-Amuah | |
| 7,222,082 B1 | 5/2007 | Adhikari et al. | |
| 7,222,330 B2 | 5/2007 | Bicknell et al. | |
| 7,613,623 B2 | 11/2009 | Nemecek et al. | |
| 7,962,358 B1 | 6/2011 | Fernandez et al. | |
| 8,001,226 B2 | 8/2011 | Matsumoto et al. | |
| 8,280,756 B1 | 10/2012 | Kanemoto et al. | |
| 8,341,591 B1 | 12/2012 | Knauth et al. | |
| 8,606,614 B1 | 12/2013 | Kanemoto et al. | |
| 8,612,275 B1 | 12/2013 | Crum et al. | |
| 2002/0165742 A1 | 11/2002 | Robins | |
| 2003/0018952 A1 | 1/2003 | Roetzheim | |

(Continued)

OTHER PUBLICATIONS

Rad, P. F., & Levin, G. (2005). A formalized model for managing a portfolio of internal projects. AACE International Transactions, , PM41-PM45.*

(Continued)

*Primary Examiner* — Peter Choi
*Assistant Examiner* — Timothy Padot

(57) ABSTRACT

As provided, a method for capital expenditure/expense flip targeting and balancing in software pipeline management that includes providing, for each of multiple projects in a software project pipeline, a set of inputs that includes 1) resource demand, 2) budget constraint, 3) start date, and 4) a capital expenditure/expense flip date. The method also includes aggregating the inputs. The method further comprises calculating an overall capital expenditure/expense ratio, and comparing the ratio to a threshold as of a predetermined date.

20 Claims, 6 Drawing Sheets

(56) References Cited

U.S. PATENT DOCUMENTS

| | | | |
|---|---|---|---|
| 2003/0083891 A1 | 5/2003 | Lang et al. | |
| 2003/0083912 A1* | 5/2003 | Covington, III et al. | 705/7 |
| 2003/0126141 A1 | 7/2003 | Hassman et al. | |
| 2004/0001103 A1* | 1/2004 | Fliess et al. | 345/810 |
| 2004/0073467 A1* | 4/2004 | Heyns et al. | 705/7 |
| 2004/0078254 A1* | 4/2004 | Piechl et al. | 705/7 |
| 2004/0111306 A1 | 6/2004 | Yokota et al. | |
| 2004/0117046 A1 | 6/2004 | Colle et al. | |
| 2004/0162748 A1 | 8/2004 | Vogel et al. | |
| 2004/0162749 A1 | 8/2004 | Vogel et al. | |
| 2004/0162753 A1 | 8/2004 | Vogel et al. | |
| 2005/0114829 A1 | 5/2005 | Robin et al. | |
| 2005/0114830 A1 | 5/2005 | Knutson et al. | |
| 2005/0120332 A1 | 6/2005 | Martin et al. | |
| 2005/0137920 A1 | 6/2005 | O'Connor et al. | |
| 2006/0010418 A1 | 1/2006 | Gupta et al. | |
| 2006/0053043 A1 | 3/2006 | Clarke | |
| 2006/0129439 A1 | 6/2006 | Arlt et al. | |
| 2006/0167732 A1 | 7/2006 | Ricketts | |
| 2006/0235732 A1 | 10/2006 | Miller et al. | |
| 2007/0006161 A1 | 1/2007 | Kuester et al. | |
| 2007/0073576 A1 | 3/2007 | Connors et al. | |
| 2007/0100685 A1 | 5/2007 | Brickhaus et al. | |
| 2007/0112945 A1 | 5/2007 | Brown et al. | |
| 2007/0179871 A1* | 8/2007 | Minor et al. | 705/35 |
| 2008/0110971 A1 | 5/2008 | Pover et al. | |
| 2008/0183549 A1 | 7/2008 | Connors et al. | |

OTHER PUBLICATIONS

Frizelle, G. D. M. (1993). Model for maximizing the return on capital projects under timing uncertainty. International Journal of Project Management, 11(1), 39.*

Kanemoto, Michael W.; et al., "Milestone Initial Scheduling," U.S. Appl. No. 11/196,692, filed Aug. 3, 2005; Specification (23 pgs.) and Drawings (3 sheets).

Crum, James L, dal. "Spreading Algorithm for work and Time Forecasting," U.S. Appl. No: 11/195,964, filed Aug. 3, 2005, Specification (25 pgs.) and Drawings (4 sheets).

Knauth, Margaret J., et al., "Predictive Growth Burn Rate in Development Pipeline," U.S. Appl. No. 11/403,669, filed Apr. 13, 2006, Specification (27 pgs.) and Drawings (3 sheets).

Knauth, Margaret J., et al., "A Method and Software Tool for Real-Time Optioning in a Software Development Pipeline," U.S. Appl. No. 11/403,773, filed Apr. 13, 2006, Specification (32 pgs.) and Drawings (9 sheets).

Kanemoto, Michael W., et al., "Hardware/Software and Vendor Labor Integration in Pipeline Management," U.S. Appl. No. 11/403,652, filed Apr. 13, 2006, Specification (30 pgs.) and Drawings (6 sheets).

Leffingwell, Dean, et al., "Tactical Management of Agile Development: Achieving Competitive Advantage," Rally Software Development Corporation, 2004.

Rautiainen, Kristian, et al., "4CC: A Framework for Managing Software Product Development," Helsinki University of Technology, Engineering Management Journal, vol. 14, No. 2, Jun. 2002, pp. 27-32.

Smith, Stephen F., et al., "Scheduling and Visualization," Final Technical Report AFRL-IF-RS-TR-2004-142, Jun. 2004, Carnegie Mellon University.

Office Action dated Mar. 29, 2011, U.S. Appl. No. 11/196,692, filed on Aug. 3, 2005.

Final Office Action dated Apr. 27, 2011, U.S. Appl. No. 11/403,773, filed on Apr. 13, 2006.

Bott, M.F., "Software as a Corporate Asset" IEE Proc-Softw. vol. 147, No. 2, Apr. 2, 2000, 6pgs.

Lassila, Ora, et. al., "Toward the Development of Flexible Mixed-Initiative Scheduling Tools", Robotics Institute, Carnegie Mellow University, Mar. 15, 1994, 12 pgs.

Smith-Daniels, Dwight E., et al., "Heuristic Scheduling of Capital Constrained Projects", Journal of Operations Management 14, 1996, 14 pgs.

Ulusoy, Gündüz, et al., "A framework for an interactive project scheduling system under limited resources," European Journal of Operational Research 90, 1996, 14 pgs.

Office Action dated May 9, 2012, U.S. Appl. No. 11/403,773, filed on Apr. 13, 2006.

Armour, Phillip, "Ten Unmyths of Project Estimation," Communications of the ACM, Nov. 2002, vol. 45. No. 11, 4 pgs.

Office Action dated Jun. 8, 2010, U.S. Appl. No. 11/491,203, filed on Jul. 21, 2006, 39 pgs.

Cohen, Morris A., et al., "New Product Development: The Performance and Time-to-Market Tradeoff," Management Science, vol. 42, No. 2, Feb. 1996, 15 pgs.

Advisory Action dated Jun. 28, 2010, U.S. Appl. No. 11/196,692, filed on Aug. 3, 2005, 3 pgs.

Advisory Action dated Nov. 24, 2010, U.S. Appl. No. 11/403,669, filed on Apr. 13, 2006.

Dean, Burton V., et al., "Multiproject Staff Scheduling with Variable Resource Constraints," IEEE Transactions on Engineering Management, vol. 39, No. 1, Feb. 1992, pp. 59-72.

Pfahl, Dietmar, et al., "Integration of System Dynamics Modeling with Descriptive Process Modeling and Goal-Oriented Measurement," The Journal of Systems and Software vol. 46, 1999, pp. 135-150.

Powell, Anthony, et al., "Strategies for Lifecycle Concurrency and Iteration—A System Dynamics Approach," The Journal of Systems and Software, 1999, vol. 46, pp. 151-161.

Final Office Action dated Sep. 14, 2010, U.S. Appl. No. 11/403,669, filed on Apr. 13, 2006, 22 pgs.

Office Action dated Aug. 19, 2010, U.S. Appl. No. 11/403,773, filed on Apr. 13, 2006, 31 pgs.

Alsup, Lance A., et al., Patent Application entitled, "Project Estimator", filed Jul. 21, 2006, U.S. Appl. No. 11/491,203.

Deltek—Resource Planning and Project Budgeting Software for Professional Consultants: Wind 2, "Wind2 Resource Scheduling and Budgeting (RSB)," http://www.wind2.com/products/rsb.asp, Oct. 12, 2005, Wind2 Software Inc., 8 pgs.

Heires, James T., et al., What I Did Last Summer: A Software Development Benchmarking Case Study, IEEE Software, Sep./Oct. 2001, pp. 33-39.

Lipner, Steve, "The Trustworthy Computing Security Development Cycle," IEEE Security Conference, Dec. 2004, 12 pages.

Musselman, Kenneth, et al., "The Role of Simulation in Advanced Planning and Scheduling," IEEE Simulation Conference 2002, vol. 2, Dec. 2002, pp. 1825-1830.

Pham, Hoang, et al., "Software Cost Model With Warranty and Risk Costs," IEEE Transactions on Computers, vol. 48, No. 1, Jan. 1999, pp. 71-75.

Office Action dated Sep. 16, 2009, U.S. Appl. No. 11/196,692, filed on Aug. 3, 2005, 36 pages.

Office Action dated May 7, 2009, U.S. Appl. No. 11/195,964, filed on Aug. 3, 2005, 14 pgs.

Examiner's Answer dated Jan. 4, 2011, U.S. Appl. No. 11/195,964, filed on Aug. 3, 2005.

Advisory Action dated Dec. 23, 2010, U.S. Appl. No. 11/403,652, filed on Apr. 13, 2006.

Advisory Action dated Jan. 6, 2011, U.S. Appl. No. 11/491,203, filed on Jul. 21, 2006.

Office Action dated Mar. 29, 2010, U.S. Appl. No. 11/403,669, filed on Apr. 13, 2006, 20 pgs.

Office Action dated Mar. 30, 2010, U.S. Appl. No. 11/403,652, filed on Apr. 13, 2006, 26 pgs.

Advisory Action dated Jul. 19, 2011, U.S. Appl. No. 11/403,773, filed on Apr. 13, 2006.

Office Action dated May 9, 2011, U.S. Appl. No. 11/403,652, filed on Apr. 13, 2006.

Notice of Allowance dated Jun. 7, 2012, U.S. Appl. No. 11/196,692, filed on Aug. 3, 2005.

Notice of Allowance dated Aug. 9, 2012, U.S. Appl. No. 11/403,773, filed on Apr. 13, 2006.

Deltek.com Webpages—Deltek Project Planner, Deltek, Mar. 2002, Retrieved from Arhcive.org May 18, 2010.

IBM—Introduction to Portfolio Management IBM, Rational Software, Sep. 2005.

(56) References Cited

OTHER PUBLICATIONS

IBM—Rational Portfolio Management—Product Data Sheet IBM, 2004.
Melik, Rudolf, et al., Professional Services Automation—Optimizing Project and Service Oriented Organizations, John Wiley & Sons, 2002.
Wolff, Mario, Project and Project Portfolio Management with SAP, 2002.
Decision on Appeal dated May 6, 2013, U.S. Appl. No. 11/195,964, filed on Aug. 3, 2005.
Notice of Allowance dated Aug. 12, 2013, U.S. Appl. No. 11/195,964, filed on Aug. 3, 2005.
Notice of Allowance dated Aug. 6, 2013, U.S. Appl. No. 11/403,652, filed on Apr. 13, 2006.
Final Office Action dated Sep. 29, 2010, U.S. Appl. No. 11/403,652, filed on Apr. 13, 2006.
Final Office Action dated Oct. 27, 2010, U.S. Appl. No. 11/491,203, filed on Jul. 21, 2006.
Final Office Action dated Oct. 4, 2011, U.S. Appl. No. 11/196,692, filed on Aug. 3, 2005.
Final Office Action dated Nov. 17, 2011, U.S. Appl. No. 11/403,652, filed on Apr. 13, 2006.
Examiner's Answer dated Sep. 12, 2011, U.S. Appl. No. 11/491,203, filed on Jul. 21, 2006.
Examiner's Answer dated Sep. 21, 2011, U.S. Appl. No. 11/491,203, filed on Jul. 21, 2006.
Fox, Mark S., et al. "Isis—a knowledge-based system for factory scheduling," Expert Systems, vol. 1, No. 1, Jul. 1984.
Final Office Action dated Feb. 9, 2011, U.S. Appl. No. 11/403,773, filed on Apr. 13, 2006.
Aoyama, Mikio, "Agile Software Process and Its Experience," Department of Information and Electronics Engineering, IEEE, Niigata Institute of Technology, 1998, pp. 3-12.
Chapman, C., et al., "Constructively Simple Estimating: A Project Management Example," Oct. 2003, The Journal of the Operational Research Society, vol. 54, No. 10, p. 1050-1058.
Jandourek, Emil, "A Model for Platform Development," Hewlett-Packard Journal, Aug. 1996, pp. 1-18.
The Free Dictionary, Definition of Rate Equation, Reaction Rate, http://encyclopedia2.the freedictionary.com/Rate+equation+(chemistry), 3 pages.
Final Office Action dated Apr. 13, 2010, U.S. Appl. No. 11/196,692, filed on Aug. 3, 2005, 47 pages.
Final Office Action dated May 11, 2010, U.S. Appl. No. 11/195,964, filed on Aug. 3, 2005, 39 pgs.
Advisory Action dated Jul. 22, 2010, U.S. Appl. No. 11/195,964, filed on Aug. 3, 2005, 3 pgs.
Chapman, C., et al., "Constructively Simple Estimating: A Project Management Example," Oct. 2003, The Journal of the Operational Research Society, vol. 54, No. 10, p. 1052.
Office Action dated Oct. 30, 2009, U.S. Appl. No. 11/195,964, filed on Aug. 3, 2005, 19 pgs.
Notice of Allowance dated Sep. 17, 2013, U.S. Appl. No. 11/403,669, filed Apr. 13, 2006.
Corrected Notice of Allowability dated Nov. 12, 2013, U.S. Appl. No. 11/403,669, filed Apr. 13, 2006.

* cited by examiner

| Project | Start Date | Demand on Present Quarter in hours | Release | Priority |
|---|---|---|---|---|
| Project Andy | 1/1/06 | 300 | 2/15/07 | High |
| Project Bob | 2/5/06 | 200 | 12/31/06 | Medium |
| Project Chris | 1/20/06 | 110 | 3/30/06 | Low |
| Project Dan | 1/5/06 | 150 | 5/31/06 | Low |
| Project Eric | 2/28/06 | 300 | 2/15/07 | High |
| Project Frank | 3/11/06 | 450 | 3/30/06 | High |

PROJECT PIPELINE MANAGEMENT SYSTEMS AND METHODS HAVING CAPITAL EXPENDITURE/EXPENSE FLIP TARGETING

CROSS-REFERENCE TO RELATED APPLICATIONS

This application relates to U.S. patent application Ser. No. 11/195,964, filed Aug. 8, 2005, entitled "Spreading Algorithm for Work and Time Forecasting," by James Crum, et al, which is incorporated herein for reference for all purposes. This application relates to U.S. patent application Ser. No. 11/196,692, filed Aug. 3, 2005, entitled "Milestone Initial Scheduling," by Michael Kanemoto, et al, which is incorporated herein for reference for all purposes. This application relates to U.S. patent application Ser. No. 11/403,652, filed concurrently, entitled "Hardware/software and Vendor Labor Integration in Pipeline Management," by Kanemoto et al, which is incorporated herein for reference for all purposes. This application relates to U.S. patent application Ser. No. 11/403,773, filed concurrently, entitled "A Method and Software Tool for Real-Time Optioning in a Software Development Pipeline," by Knauth et al, which is incorporated herein for reference for all purposes. This application relates to U.S. patent application Ser. No. 11/403,669, filed concurrently, entitled "Predictive Growth Burn Rate in Development Pipeline," by Knauth, et al, which is incorporated herein for reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

In a business enterprise, a significant number of projects may be underway in parallel (e.g., in a software development pipeline) at any given time. Project planning is a challenging discipline that may involve planning the coordinated work of many people developing a new product. Over time, progress in or completion of each project may be described as having a certain demand, in terms of human resources, human skill sets, and various acquisitions, all of which have associated expenses or expenditures. In order to ensure that demand will be met over the course of a given project, managers of individual projects assess what the specific demand is for his or her own project. In a large enterprise, however, with significant numbers of projects in the software development pipeline, assessing the overall demand and how to meet it within budgetary constraints is complex. Over time, demand may grow in such a way that it exceeds the available resources, i.e. the supply.

In an enterprise, the human resources available represent only one aspect of the supply to meet the above-described demand. The labor supply may comprise individuals grouped in various ways according to the skill sets of each individual. In any enterprise, the supply of human resources, and particularly of valuable skill sets, varies over time as new individuals are hired, existing employees voluntarily leave or are laid off, and individuals come and go from the enterprise as contract workers.

Effectively timing a project according to a balance of the demand and the supply of resources, timing and budgetary constraints, and the timing of converting an expense to a capital investment, is a challenging task. Software tools can facilitate the task of project pipeline timing taking into account financial considerations such as capitalization of expenses.

SUMMARY OF THE INVENTION

According to various embodiments, a pipeline budgeting tool is provided. The tool includes an interface component to accept, for each of multiple projects in a software pipeline, a set of inputs that includes 1) resource demand, 2) budget constraint, 3) start date, and 4) a capital expenditure/expense flip date. The tool also includes an affordability determination component that aggregates the inputs, calculates an overall capital expenditure/expense ratio, and compares the ratio to a threshold as of a predetermined date.

According to various embodiments, a method for capital expenditure/expense flip targeting and balancing in software pipeline management is provided. The method includes providing, for each of multiple projects in a software project pipeline, a set of inputs that includes 1) resource demand, 2) budget constraint, 3) start date, and 4) a capital expenditure/expense flip date. The method also includes aggregating the inputs. The method further comprises calculating an overall capital expenditure/expense ratio, and comparing the ratio to a threshold as of a predetermined date.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following description, taken in connection with the accompanying drawings, wherein like reference numerals represent like parts.

FIG. 4 is an illustrative editor window of the software tool GUI according to some embodiments of the present disclosure.

DETAILED DESCRIPTION

Figure 1:
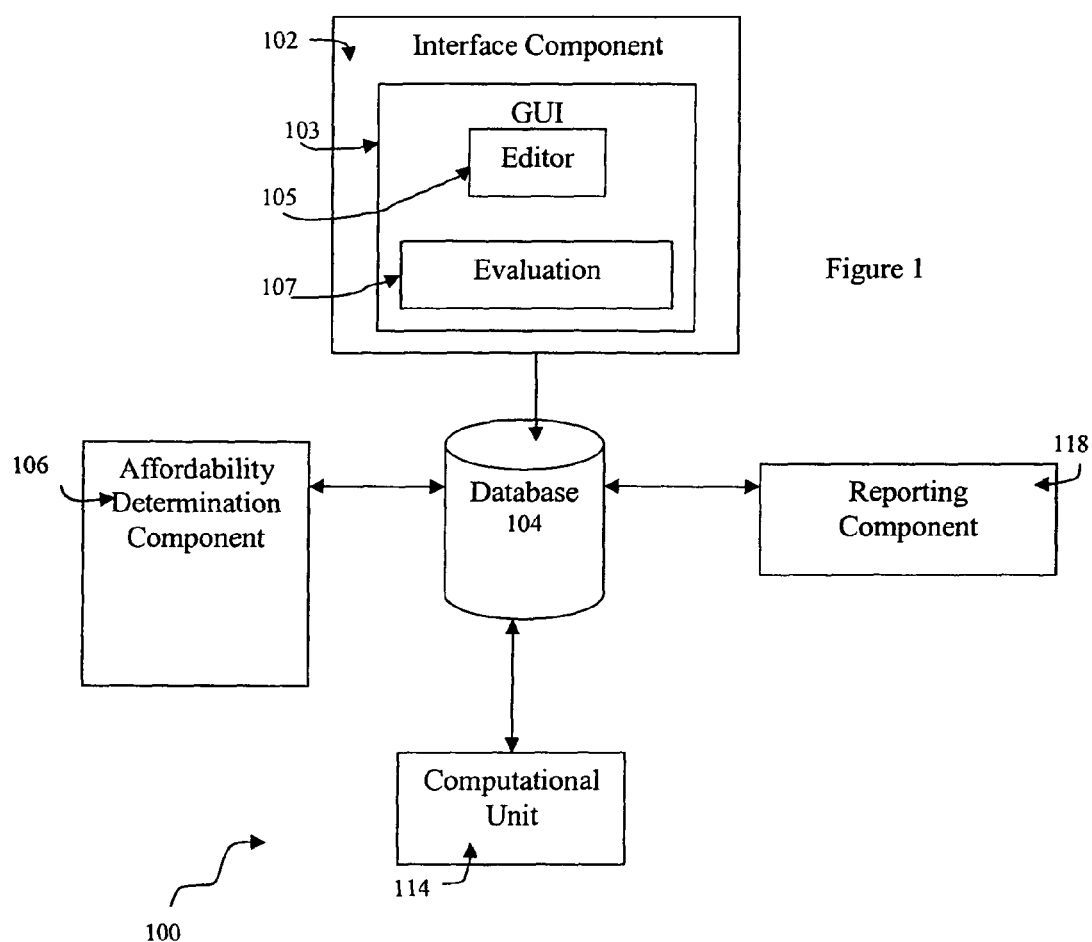
FIG. 1 is a block diagram of a software tool according to various embodiments of the present disclosure.

It should be understood at the outset that although an illustrative implementation of one embodiment of the present disclosure is illustrated below, the present system may be implemented using any number of techniques, whether currently known or not yet in existence. The present disclosure should in no way be limited to the illustrative implementations, drawings, and techniques illustrated below.

An affordability model may be defined by aggregating and balancing between the resources necessary for completing any given project, timing constraints, and budget constraints such as, for example, the date of capitalization, i.e., the date at which the expense involved in the project is converted into a capital expenditure. By targeting the capital expenditure/expense flip date and other budgetary constraints, and incorporating them into the pipeline management, individuals involved in managing a business enterprise have a more accurate, holistic view of ongoing and planned projects in terms of resources needed to complete them. Within this view, the managers can determine whether the projects fall within their budgets (or within a certain percentage above or below the budgets), and whether the ratio of capital expenditure to expense is within accepted limits for the enterprise, a particular business unit, division, strategic initiative, or other organization within the enterprise. The ratio of capital expenditure to expense is one number that enterprises use to determine the overall status of projects in the pipeline at a particular point in time, such as at the end of a fiscal year. For example, if the ratio is more heavily weighted towards expense, the ratio may be interpreted to reflect that the enterprise has too many projects ongoing in early stages. An enterprise may project a target acceptable ratio associated with its various budgets. In various embodiments, an affordability model may break down according to business units, division, strategic initiative, or other like organizational unit within a business enterprise or even individual projects, in addition to reflecting the entirety of the software development pipeline.

A software development pipeline, as referred to herein, is a long term management tool used for project development for ongoing and planned projects. In various embodiments, the software development pipeline may plan ahead for six financial quarters. For planning purposes in completing projects in a software development pipeline, resources such as labor (i.e., man hours of employees and contractors), vendor labor, hardware, and software give a more accurate assessment of affordability within budget and timing constraints than a mere supply/demand balance for a project. The additional costs associated with such resources play into an accurate project planning pipeline. Also factoring into the software development pipeline is the time at which an expense is converted into a capital expenditure, or long term asset.

One aspect of supply for the above-described demand is pure labor, as mentioned above. Available vendor labor resources represent an additional aspect of the supply to meet the above-described demand. Pure labor may adequately account for billable and non-billable hours worked internal to the enterprise as well as some out-sourced partner hours. The vendor labor supply, in contrast, may comprise a project or portion of a project that is completely outsourced, such as a piece of code purchased just as any other product is purchased. The available vendor labor resources may be limited by physical timing constraints relating to the individual source of the vendor labor, such as the time necessary for a given vendor to supply the actual vendor labor or end result. Examples of vendor labor may include credit checking systems, billing systems, provisioning systems, and the like which commonly interface with standard third party systems or sets of third party systems. Such systems may be strategically outsourced as functions that are not internally developed or maintained in-house.

Available hardware resources represent still another aspect of the supply to meet the above-described demand. The hardware resources may comprise equipment having a certain cost that may take a certain amount of time to acquire as a new resource or re-allocate from existing resources. The hardware resources may be constrained by the timeline of when equipment is actually released by its supplier, in the case of new hardware, or in the case of delivery, when hardware is backordered or special ordered. The cost of the hardware resource includes the purchase price and may also extend to maintenance and licenses necessary to continue to use the hardware. The cost involved in acquiring a hardware resource may be converted to a capital expenditure at a certain point in time, determined according to the accounting practices of the business enterprise acquiring it.

Available software resources represent another aspect of the supply to meet the above-described demand. The software resources may comprise a software product having a certain cost that may take a certain amount of time to acquire as a new resource or re-allocate from existing resources. The software resources may be constrained by the timeline of when product is actually released by its supplier in the case of new software, or when new updates are released, or when special modifications can be accomplished by the software vendor for the enterprise or a particular project. The cost of the software resource includes purchase price and may also extend to maintenance and licenses for using the software. The cost involved in acquiring a software resource may be converted to a capital expenditure at a certain point in time, determined according to the accounting practices of the business enterprise (or business unit, division, strategic initiative, etc. within a business enterprise) acquiring it.

In accounting terms, generally an expense is an outgoing payment made by a business enterprise. More specifically, whether a particular expenditure is classified as an expense may be determined based on whether it is reported immediately to the investing public in the business enterprise's income statement; and whether it is classified as a capital expenditure (i.e., long term expenditure) subject to depreciation may be determined based on the fact that it is not reported. Capital expenditures are expenditures used by a company to acquire or upgrade physical assets such as equipment, property, industrial buildings. For accounting and budgeting purposes, a capital expenditure is considered an asset because produces a long-term benefit lasting beyond the present fiscal year, while an expense is considered a liability. Under certain circumstances, an expense may be converted to a capital expenditure according to the accounting practices of the business enterprise, or business unit, division, strategic initiative, etc. within a business enterprise.

A method and software tool for capital expenditure/expense flip targeting, and hardware, software, and vendor labor financial threshold integration in software development pipeline planning are disclosed. In the example described below, the project is a computer software development project, such as for an enterprise software application. In various embodiments, the pipeline is defined by a six quarter planning period.

Referring to FIG. 1, a block diagram of a software development pipeline planning tool for capital expenditure/expense flip targeting and hardware, software, and vendor labor financial threshold integration is shown. The pipeline planning tool 100 comprises an interface component 102, a database component 104, an affordability determination component 106, and a reporting component 118. In various embodiments, the tool 100 may also include a computational component 114. The tool 100 may be implemented in software on a general purpose computer system such as that described in greater detail with respect to FIG. 6 below.

The interface component 102 receives inputs for a project being developed in a project pipeline. In various embodiments, the inputs include labor demand, vendor labor demand, hardware demand, and software demand for the project. For example, the interface component 102 may receive input of demand units in terms of skill sets and number of hours of time over the course of a given project (for labor), or the type, cost associated with and timing/availability for acquiring a particular hardware, software, or vendor labor resource. The demand units may be broken down to number of hours of particular skill sets or applications necessary to completion of a given project, dollars, or time extending the duration of the project.

In various embodiments, the interface component 102 comprises a graphical user interface (GUI) 103. The graphical user interface (GUI) 103 receives inputs from the user of the tool. The GUI 103 presents, in graphical or textual form, various data to the user of the tool. In various embodiments, the graphical user interface (GUI) 103 further comprises an editor window 105 and a evaluation window 107. The inputs may be obtained via the editor window 105, and the various data, including a software development pipeline model, may be presented via the evaluation window 107. In various embodiments, the user may manually switch between the editor window 105 and the evaluation window 107, or alternatively the tool 100 may autonomously switch between the editor window 105 and the evaluation window 107. In yet other embodiments, the functions of the evaluation window 107 and the editor window 105 may be combined so that, e.g., the evaluation window 107 includes fields for editing input parameters.

For each project, there will be a targeted budget with budgetary constraints that are additional inputs to the tool 100. The budget factors may be set in terms of dollars. The budget factors may be set with acceptable margins, for example, a predetermined percentage below or above budget may be permissible under enterprise budget guidelines. One budget factor is the total sum of money allocated for the project during a period of time. Another budget factor may include a projected capital expenditure/expense flip date that signifies when the expenses associated with a project (such as the cost of acquisition of hardware or software) may be converted into capital expenditures and considered long term assets, rather than liabilities. In various embodiments, the projected expenditure/expense flip date is determined by each individual business unit that has fiscal responsibility for an individual project. In such various embodiments, each individual enterprise, business unit, division, strategic initiative, or like organizational unit within a business enterprise may have its own process for determining the projected expenditure/expense flip date, the details of which are not necessary to the present disclosure.

The database component 104 stores inputs from the interface component 102. In various embodiments, the inputs from the interface component 102 are in a raw data form, and are stored in the database component 104. The database component 104 may also store the results from various other components, as will be discussed further below.

Figures 2, 3:
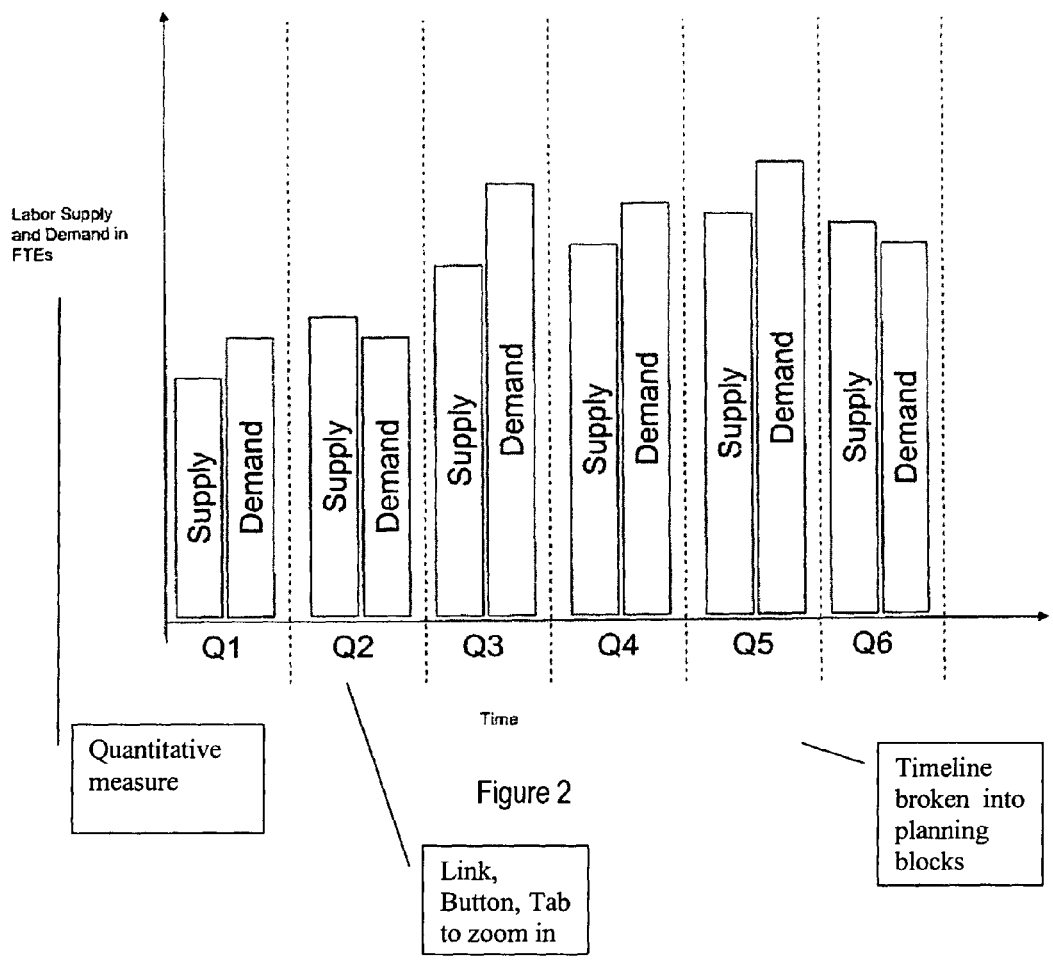
FIG. 2 is an illustrative view of an evaluation window in the GUI that reflects the software development pipeline, in accordance with some embodiments of the present disclosure.
FIG. 3 is an illustrative view of an evaluation window 107 in the GUI 102 providing greater detail to which a user may be transferred from the view of FIG. 2.

FIG. 2 is one illustrative view of an evaluation window 107 in the GUI 102 that reflects the software development pipeline, in an embodiment for six quarter planning. As shown in FIG. 2, the whole software development pipeline, or alternatively a portion of it, may be shown graphically. Along a first axis, a timeline for the planning period is shown, broken into manageable planning blocks, such as, for example, quarters. Each quarter shown may comprise a link, button, tab or the like which may be selected by the user. Along the second axis is a quantitative measure of inputs in the software development pipeline create a graphical representation of the pipeline status. As shown in FIG. 2, the quantitative measure may comprise values for labor supply and labor demand, in units of hours or Full Time Employees ("FTEs"), graphed against time. The growth and decline of labor supply and labor demand may be charted across the planning period. For detail into the trend over time, the user may select a particular quarter or particular balance between supply and demand to zoom into another view.

FIG. 3 is another illustrative view of an evaluation window 107 in the GUI 102 showing a more detailed view to which a user may be transferred from the view of FIG. 2. Specifically, by selecting one of the links for a given quarter, such as Q1 in the view of FIG. 2, the user is transferred to the more detailed view of FIG. 3, which lists, graphically or textually, the projects ongoing during the selected quarter and various details pertaining to each. From this view, a particular project may be selected from the list (in a form such as a tab, button, link or the like) in order to edit the selected project or examine it in still greater detail. Additional details pertaining to each project are also displayed, such as, for example, the start date or timing, the demand for the project for the selected quarter, in hours or FTEs, the release date, and the project priority. The displayed details may provide insight to the user regarding the source of meaningful discrepancy between labor supply and labor demand from FIG. 2. If the user can identify, from the details, which project or group of projects may be contributing to the discrepancy between labor supply and labor demand (in financial terms), the user may select that project or group of projects (in a link, button, tab or the like) in order to open it in an editor window 105 (such as in FIG. 4).

Figure 4:
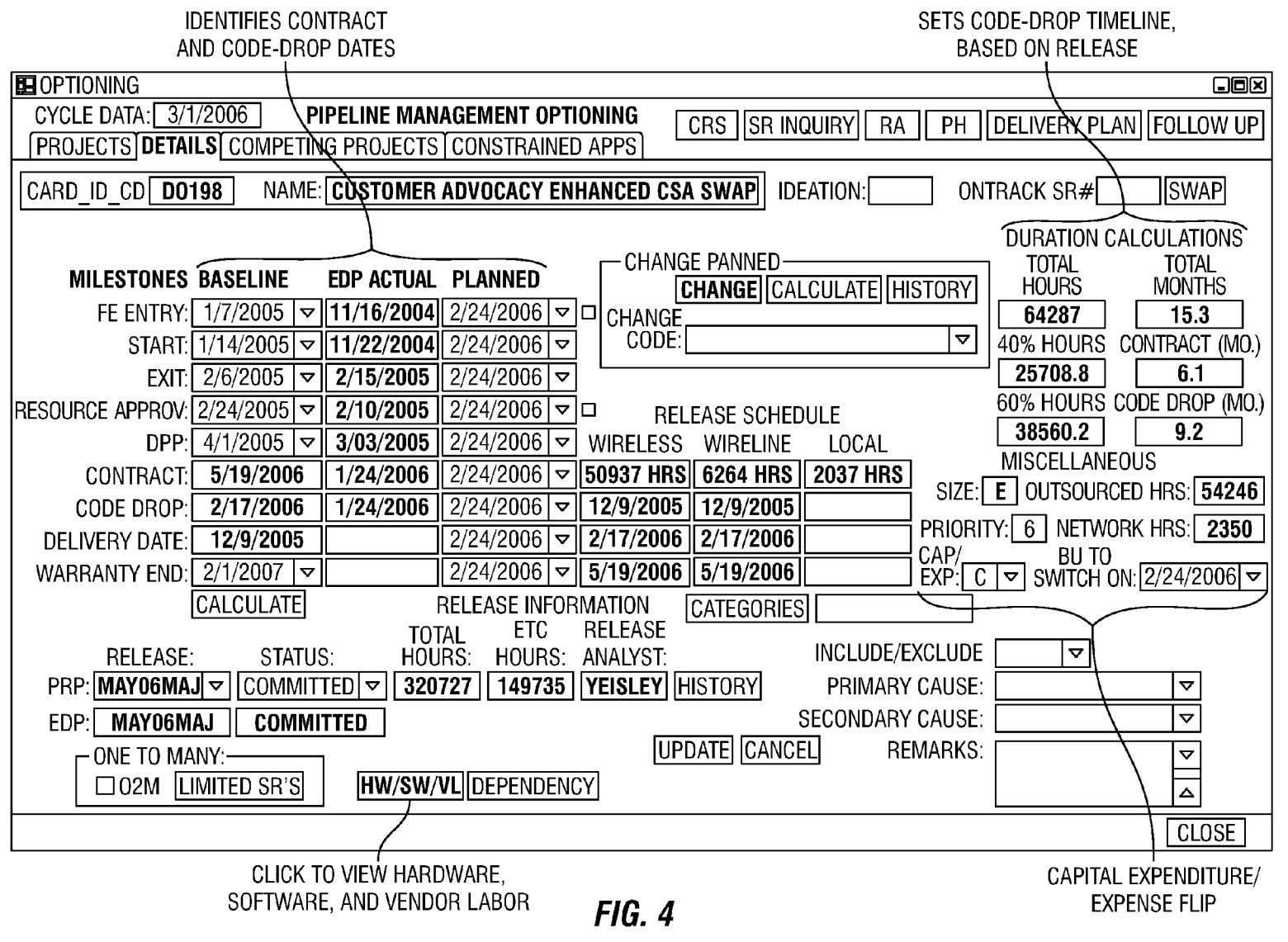

FIG. 4 is an illustrative view of an editor window 105 in the GUI 102. As seen in FIG. 4, in various embodiments, the user may enter milestone dates which may include target, actual, or planned dates and/or milestones, for example, by entering in a text field, or choosing from a drop-down menu. Such target, actual, or planned dates and/or milestones may include, for example, start dates, approval dates, various contract dates, drop dates, delivery dates, and or warranty dates. The milestone dates may, in various embodiments, identify the contract and code-drop dates for a given project. In various embodiments, the user may additionally enter various release dates and hours of labor anticipated, planned, or actually used, in a release date field (text field or drop-down menu). A project may, in various embodiments, have a release date for different components of the project, such as when a project requires both hardware and software components that are released at specific release times, and which may be similar or different from each other. In various embodiments, in the edit window of the GUI 102, the user may enter a priority for the project, either in a drop-down menu or a text field. In additional text fields or drop-down menus, the user may enter or select various duration calculations that may be used, for example, in tracking progress and for setting the code-drop time-line based on the release (employing, for example, the spreading algorithm disclosed in U.S. patent application Ser. No. 11/195,964, entitled "Spreading Algorithm for Work and Time Forecasting," referenced above). Spreading involves using data relating to consumption schedules to estimate resource consumption in each phase of a task to obtain greater insight into and understanding of future needs, and timing projects such that they are feasible within the limits of available resources, and affordable within the limits of budgets. In still another drop-down menu or text field, the user may enter the timing of a flip from expense to capital expenditure for acquisitions made to complete the project.

Also in the editor window 105 of the GUI 102, the user may select from various views, in some embodiments by selecting a tab or clicking a link, in order to review the whole of the projects in the tool (e.g., back to view of FIG. 2), with a particular project selected, to review any competing or related projects, and for a particular project, any constraints. The user may additionally select from various views, such as an evaluation window 107 that provides more detailed view of hardware, software, and vendor labor (as can be seen in FIG. 5), or a more detailed view of timing and budgetary factors relating to flip from expense to capital expenditure.

Figure 5:
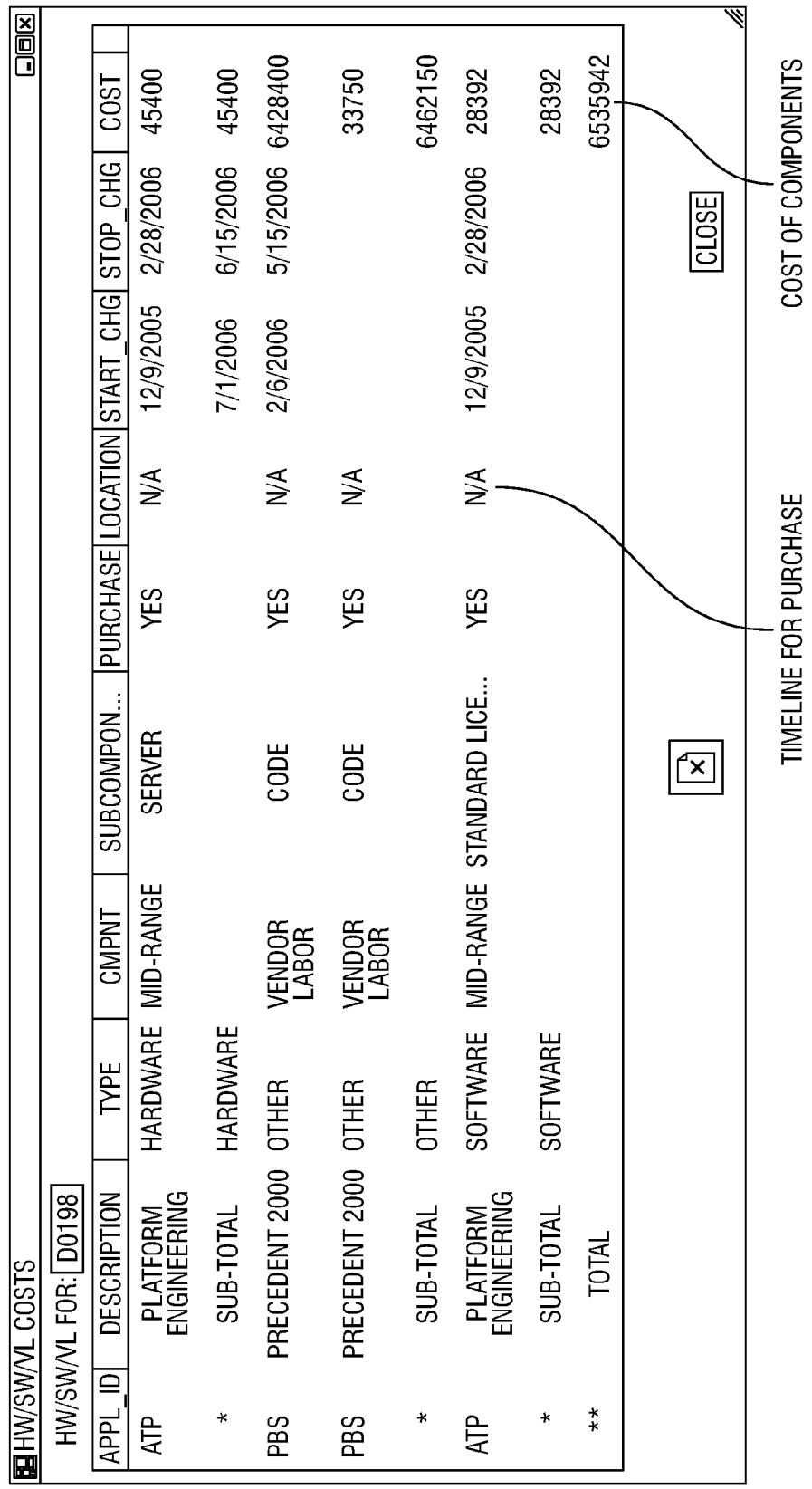
FIG. 5 is an illustrative evaluation window of the software tool GUI according to some embodiments of the present disclosure.

FIG. 5 is an illustrative view of a detailed view of an evaluation window 107 in the GUI 102. As seen in FIG. 5, in various embodiments, the more detailed view includes details relating to hardware, software and vendor labor acquisitions, including timing and budgetary factors. Based on the inputs entered by way of the editor window 105, the evaluation window 107 reflects the identity of one or more items used in completed of the selected project. The evaluation window 107 further displays the type of each of the identified items, timing relating to acquisition of each identified items (such as, for example, start and stop dates), and the cost of each item. Such a view in the evaluation window 107 may additionally include, for example, timing of the capital expenditure/expense flip, other timing constraints that arise from other projects, and the interplay of timing for labor with timing and budgeting for the identified items. In various embodiments, when a potential change is entered in the editor window 105, it is reflected in real-time in the evaluation window 107 (e.g., in FIG. 2 for the whole software development pipeline), as well as in each detailed view of the edited project (e.g., FIGS. 1D and 1E).

Returning to FIG. 1, the affordability determination component 106 aggregates the various inputs relating each project in the pipeline in order to generate an affordability model balancing the costs of the inputs and the budgetary constraints (including, for example, a timing aspect of the capital expenditure/expense flip date for each project in the pipeline) over time for a holistic view of the software development pipeline in financial terms. In various embodiments, the affordability model extends over six financial quarters for an optimized planning period. The affordability determination component 106 may permit a user to adjust one or more input constraints, vary budget targets, including capital expenditure/expense flip dates, and the like, and see the modeled impact of the adjustment before actually implementing a change. In various embodiments, timing of a project in the software development pipeline may be adjusted such that the capital expenditure/expense flip date occurs within a particular fiscal year as desired, in order to see how the timing change affects the overall ratio of capital expenditure to expense at the end of the fiscal year. The affordability model generated by the affordability determination component 106 may be stored in the database component 104, and updated over time.

The affordability determination component 106 is a software component or program that generates an affordability model based on the aggregation of the inputs supplied by the user to the GUI 102. In various embodiments, the affordability model is generated by the affordability determination component 106 according to methods disclosed in U.S. patent application Ser. No. 11/195,964, filed Aug. 8, 2005, entitled "Spreading Algorithm for Work and Time Forecasting," by James Crum, et al, and U.S. patent application Ser. No. 11/196,692, filed Aug. 3, 2005, entitled "Milestone Initial Scheduling," by Michael Kanemoto, et al, both of which are incorporated herein for reference for all purposes. Using data relating to consumption schedules to estimate resource consumption in each phase of a task provides greater insight into and understanding of future needs, and projects can be timed such that they are feasible within the limits of available resources, and affordable within the limits of budgets.

The affordability model, in various embodiments, may be represented in a textual view, similar to a large spreadsheet, or may be represented in a graphical view, in order to represent a holistic view oriented to the highest organizational level of planning. From the affordability model representing the pipeline, individual projects or groups of projects may be selected. In various embodiments, the selection may be performed by clicking a link in a textual view, clicking a graphical representation of the project or projects, choosing a project or projects from a drop-down menu, or the like. By selecting in the affordability model a project or group of projects, the display transfers to one of various other views for additional detail, such as the editor window 105 or the evaluation window 107.

In various embodiments, the affordability determination component 106 balances the affordability model to achieve an optimal alignment of inputs to budgetary and timing constraints—for example, by capitalizing projects at such appropriate point in time that will result in the targeted capital expenditure/expense ratio at the end of the fiscal year. In other words, the affordability determination component 106 balances the budgetary constraints and the flip date for the projects in the pipeline as a whole in order to time projects to be completed within the budgetary constraints and result in the desired capital expenditure/expense ratio at a certain point in time, such as at the end of a fiscal year. In various embodiments, the affordability determination component 106 incorporates knowledge and business know-how of the user to balance the labor, vendor labor, hardware, and software costs with budgetary and other constraints, including the capital expenditure/expense flip date. In various embodiments, the affordability determination component 106 utilizes an algorithm to balance the labor, vendor labor, hardware, and software inputs with timing and budgetary constraints, including the capital expenditure/expense flip date. A change such as, for example, in resource supply, demand, or a capital expense flip target, may be entered for a single project. Similarly, a change, such as, for example, a budget modification, may be entered for a class of like projects, such as all projects occurring during a time frame, all projects sponsored by a particular business unit, division, strategic initiative, and the like. A change such as, for example, altering the acquisition costs associated with a particular hardware or software resource, may even be applied to all projects for the enterprise that are ongoing in the pipeline.

In various embodiments, the algorithm utilized may comprise the spreading algorithm disclosed in U.S. patent application Ser. No. 11/195,964, filed Aug. 8, 2005, entitled "Spreading Algorithm for Work and Time Forecasting," by James Crum, et al, which is incorporated herein for reference for all purposes. The spreading algorithm method provides for application inclusion and impact type, size of project, desired start date and end date, and release type and dates (i.e. code-drop, release implementation that affect the inclusion of hardware, software, and vendor labor by setting project lifecycle "end-to-end" success and delivery). When accounted for, introduction of various components such as hardware, software, or vendor labor leads the establishment of a successful project lifecycle setting based on component purchase, availability, and fiscal timing. For example, hardware components are purchased after a project has completed the contract phase. The purchase and receipt of hardware, as well as when the expense associated with the purchase flips to capital expenditure, should be parallel to the timeline of the contract (established by the spreading algorithm), and allow time for work that is done in specific phases of a project to coincide with that hardware component's availability and financial feasibility.

The inclusion of components such as labor, hardware, software and vendor labor does not affect how the technical spreading of project hours is performed, but does directly affect the "end-to-end" success of planning for a project. The same holds true for the availability and procurement of software, and the availability of vendor labor, as predetermined by the vendor contract with the specific project.

In various embodiments, the change may be applied automatically according to the algorithm by comparing the inputs for the project(s) to various threshold values (such as a threshold ratio of capital expenditure to expense) to determine whether a change is applied, or alternatively, may be entered manually by the user.

In various embodiments, the affordability determination component 106 calculates an overall capital expenditure/expense ratio from the aggregate of inputs. The affordability determination component 106 may also calculate a target ratio of capital expenditure to expense to use and a threshold ratio for comparison, or a user may input the target ratio and threshold ratio.

As stated above, the interface component 102 comprises an evaluation window 107. The evaluation window 107 displays the affordability model generated by the affordability determination component 106 over time and may display one or more reports generated by the reporting component 118 of the tool 100. The reporting component 118 generates reports relating to the balance between budgetary and other constraints (including the capital expenditure/expense flip date) and the costs of labor, vendor labor, hardware and software, the overall capital expenditure/expense ratio, and the difference between the overall capital expenditure/expense ratio and the threshold ratio. In various embodiments, the reporting component 118 generates a coded report for capital expenditure/expense flip targeting, wherein a first code indicates the overall ratio of capital expenditure to expense exceeds the threshold, and a second code indicates the threshold equals or exceeds the overall ratio of capital expenditure to expense.

In various embodiments, the reporting component 118 similarly generates a coded report for budget threshold integration, wherein a first code is reflected for time periods when the budget exceeds the actual spending (i.e., underspending is occurring), and a second code is reflected for time periods when the actual spending exceeds the budget (i.e., overspending is occurring). The budget threshold integration may be broken down along the lines of budgets and spending for hardware, software and vendor labor separately.

In various embodiments, the codes are alerts, symbols, highlighted or bolded text, or color codes to call attention to time periods when the actual ratio exceeds the target or threshold ratios.

The affordability determination component 106 refreshes the affordability model and the capital expenditure/expense ratio as time passes, and adjusts the affordability model and the capital expenditure/expense ratio in order to optimize the balance of the inputs of labor, vendor labor, hardware, and software with timing and budgetary constraints, including the capital expenditure/expense flip date for all of the projects in the pipeline. For example, it may be desirable in various embodiments to adjust either the budget, various costs, the flip date (and thereby the capital expenditure/expense ratio) and review how the adjustments affect the ratio of capital expenditure to expense at the end of the fiscal year before making management and planning decisions.

In various embodiments, the tool 100 also optionally includes a computational component 114 that takes raw data from the interface component 102, via the database component 104, and applies a conversion algorithm to convert the raw data into a format useful by the tool 100. In various embodiments, the computational component 114 converts the inputs in hours over time into a number of Full Time Employees ("FTEs") representing the skills and time required by the labor demand. In various embodiments, the computational component 106 is optional, as is the conversion of labor demand to a number of FTEs. Similarly inputs for vendor labor, hardware, and software may be converted from raw dollars and time into a more accurate measure of cost. By converting all inputs into a common format, the tool may analyze a much more detailed view of the pipeline than tools that, by virtue of being limited by input formats, only analyze labor supply and demand.

Figure 6:
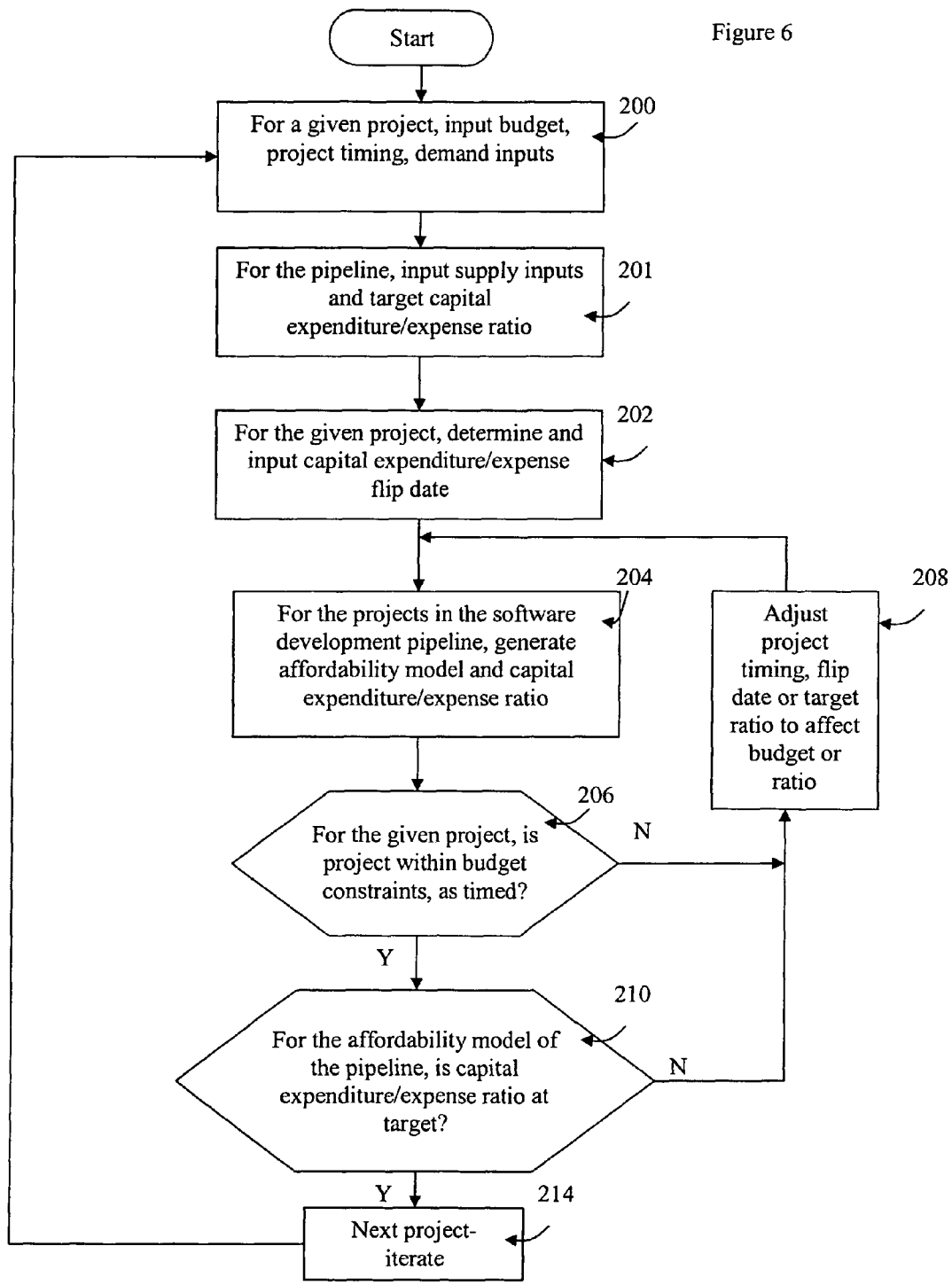
FIG. 6 is a logic flow diagram of a process according to various embodiments of the present disclosure.

Referring to FIG. 6, a flowchart for a method for capital expenditure/expense flip targeting and supply/demand balancing in pipeline management in accordance with various embodiments of the present disclosure is shown. The method begins with the tool receiving a project into the software development pipeline tool by a user inputting budget, project timing, and demand inputs for a given project to the interface component 102 (block 200). The tool also receives supply inputs and target capital expenditure/expense ratio for the software development pipeline as a whole to the interface component 102 (block 201). The capital expenditure/expense flip date for the given project is determined according to the accounting practices of the business enterprise and input to the interface component 102 (block 202).

For the projects in the pipeline, the affordability determination component 106 generates the affordability model and capital expenditure/expense ratio for a predetermined date, which in various embodiments is the fiscal year end. (block 204). The affordability model and capital expenditure/expense ratio may then be used in analysis.

In the analysis, the question "For the given project, is the project within the budget constraints as it is presently timed?" is asked and analyzed (block 206). If the project is not within the budget constraints entered for that project, the tool 100 adjusts the project timing or inputs for labor, vendor labor, hardware or software (provided in block 200) according to an algorithm or know-how of the user in order to fit the project within the budget constraints (block 208). In various embodiments, the budget constraints may also or alternatively be adjusted in order to fit the project within the constraints, in the event that project timing and/or inputs cannot be adjusted sufficiently to make the project fit within the fiscal constraints.

If the project is within the budget constraints at block 206, the method proceeds with the analysis by asking and analyzing the question "For the projects in the pipeline, is the capital expenditure/expense ratio (determined in block 204) at the target?" (block 210). If the holistic view of all the projects in the pipeline reflects that the capital expenditure/expense ratio is not at or near the target (to within a certain percentage of the target ratio as is acceptable under enterprise, business unit, etc. guidelines), then the tool adjusts the project timing, flip date, or inputs for labor, vendor labor, hardware or software for the given project being added to the pipeline (provided in block 200) in order to alter the capital expenditure/expense ratio and optimize it to align as much as possible with the target ratio (block 208). In various embodiments, the target capital expenditure/expense ratio may be adjusted in order to fit the project and pipeline as a whole within the constraints, in the event that project timing and/or inputs cannot be adjusted sufficiently to make the project and, therefore, the pipeline as a whole fit within the fiscal constraints.

If the holistic view of all the projects in the pipeline reflects that the capital expenditure/expense ratio is at or near the target (to within a certain percentage of the target ratio as is acceptable under enterprise guidelines), then the tool iterates the method process for any number of other projects in the software development pipeline (block 214).

In various embodiments, the tool and process described above may further analyze additional constraints, such as physical timing limitations, in addition to fiscal constraints. For example, a project may not be affordable within the fiscal constraints because of a timing constraint such as, for example, an increase cost for rushed shipping of a necessary hardware or software resource in order to accomplish the project as timed. Tying in physical timing limitations, having to do with when necessary resources become available, adds another layer of analysis analogous to that described above, and provides the opportunity for further optimization of the software development pipeline.

Figure 7:
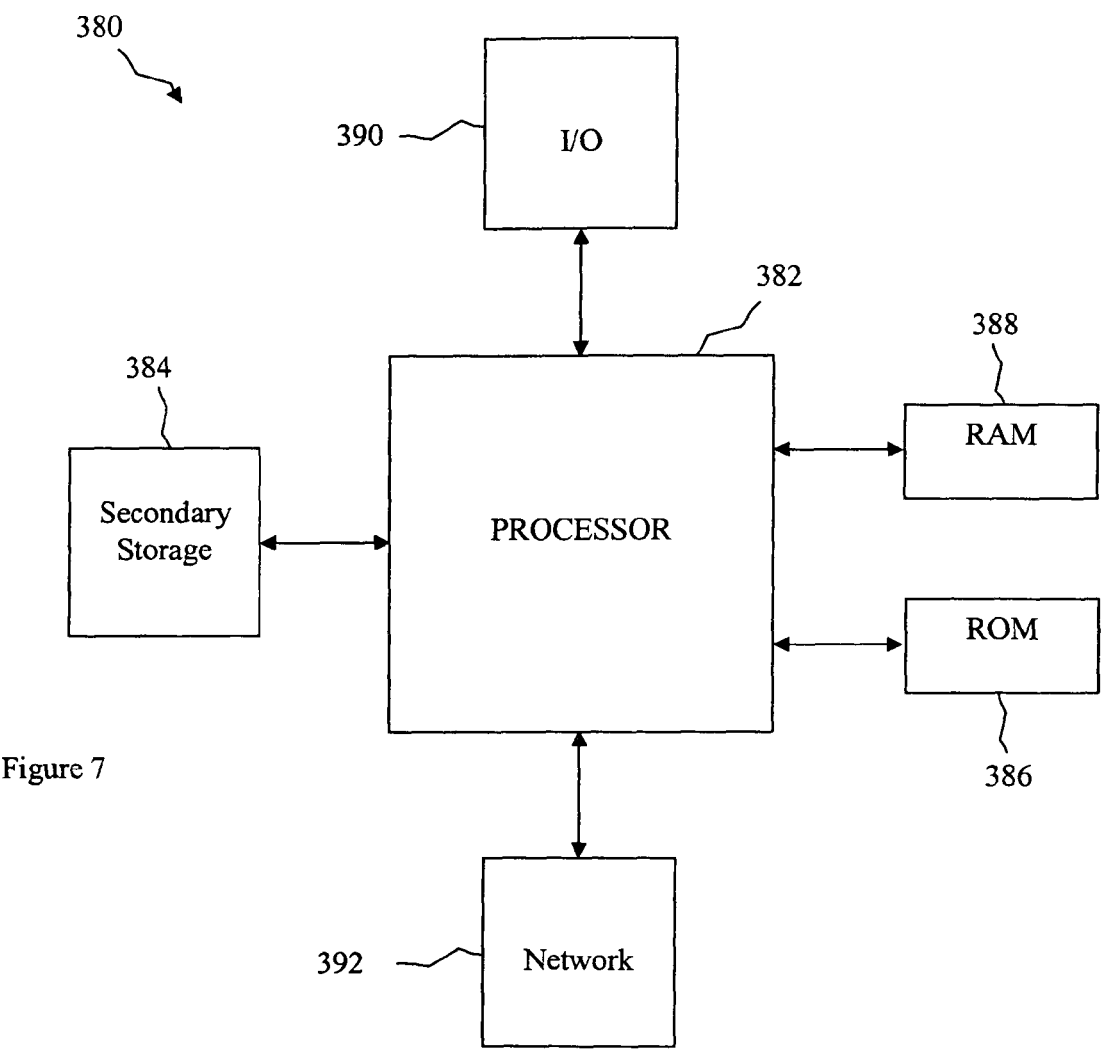
FIG. 7 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 7 illustrates a general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which has a small memory capacity relative to the larger memory capacity of secondary storage. The RAM 388 is used to store volatile data and perhaps to store instructions. Access to both ROM 386 and RAM 388 is faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A pipeline budgeting tool embodied on a computer readable medium and executable by a processor, wherein the pipeline budgeting tool comprises:

an interface component to accept, for each of multiple projects in a software pipeline, a set of inputs that includes 1) resource demand, 2) budget constraint, 3) start date, and 4) a capital expenditure/expense flip date, wherein the capital expenditure/expense flip date comprises a date at which an expense involved in a corresponding project is converted into a capital expenditure; and an affordability determination component that aggregates the inputs, calculates an overall capital expenditure/expense ratio, and compares the ratio to a threshold as of a predetermined date, wherein the affordability determination component determines a violation date on which the ratio falls below the threshold, and wherein the affordability determination component advances a first subsequent capital expenditure/expense flip date of a project to the violation date, thereby preventing the ratio from falling below the threshold.

2. The pipeline budgeting tool of claim 1, wherein the affordability determination component notifies a user if the ratio falls below the threshold as of the predetermined date.

3. The pipeline budgeting tool of claim 2, wherein the affordability determination component accepts a new threshold value from the user.

4. The pipeline budgeting tool of claim 1, wherein the affordability determination component determines a violation date on which the ratio falls below the threshold, and wherein the affordability determination component advances a preceding start date of a project past the violation date, thereby preventing the ratio from falling below the threshold.

5. The pipeline budgeting tool of claim 1, wherein if the ratio falls below the threshold, the affordability determination component generates one or more corrective alternatives, presents the corrective alternatives to a user, and implements those of the corrective alternatives that are selected by the user.

6. The pipeline budgeting tool of claim 1, wherein if the ratio falls below the threshold, the affordability determination component generates one or more corrective alternatives, autonomously without direction from a user implements the corrective alternatives, and notifies the user of implemented corrective alternatives.

7. The pipeline budgeting tool of claim 1, wherein the affordability determination component applies a spreading algorithm that generates project timing for the projects in the software pipeline such that the overall capital expenditure/expense ratio equals a target as of the predetermined date.

8. The pipeline budgeting tool of claim 1, wherein the predetermined date is the last date of a fiscal planning period.

9. The pipeline budgeting tool of claim 1, further comprising a computational unit that applies an algorithm to normalize the inputs to a common format.

10. The pipeline budgeting tool of claim 1, further comprising a reporting component that generates a coded report having a first code and a second code:
wherein the first code indicates that the ratio exceeds the threshold; and
wherein the second code indicates that the threshold is equal to or exceeds the ratio.

11. A pipeline budgeting tool embodied on a computer readable medium and executable by a processor, wherein the pipeline budgeting tool comprises:
an interface component to accept, for each of multiple projects in a software pipeline, a set of inputs that includes 1) resource demand, 2) budget constraint, 3) start date, and 4) a capital expenditure/expense flip date, wherein the capital expenditure/expense flip date comprises a date at which an expense involved in a corresponding project is converted into a capital expenditure; and
an affordability determination component that aggregates the inputs, calculates an overall capital expenditure/expense ratio, and compares the ratio to a threshold as of a predetermined date, wherein the affordability determination component determines a violation date on which the ratio falls below the threshold, and wherein the affordability determination component reduces expenses by advancing one or more projects classified as low priority past the predetermined date, thereby preventing the ratio from falling below the threshold.

12. A method for capital expenditure/expense flip targeting and balancing in software pipeline management, the method comprising the computer implemented steps of:
receiving, at a processor, for each of multiple projects in a software project pipeline, a set of inputs that includes 1) resource demand, 2) budget constraint, 3) start date, and 4) a capital expenditure/expense flip date, wherein the capital expenditure/expense flip date comprises a date at which an expense involved in a corresponding project is converted into a capital expenditure;
aggregating, with a processor, the inputs;
calculating, with a processor, an overall capital expenditure/expense ratio;
comparing, with a processor, the ratio to a threshold as of a predetermined date; and
determining a violation date on which the ratio falls below the threshold, and advancing a preceding start date of a project past the violation date, thereby preventing the ratio from falling below the threshold.

13. The method of claim 12, further comprising notifying a user if the ratio falls below the threshold as of the predetermined date.

14. The method of claim 12, further comprising determining a violation date on which the ratio falls below the threshold, and advancing a first subsequent capital expenditure/flip date of a project to the violation date, thereby preventing the ratio from falling below the threshold.

15. The method of claim 12, further comprising determining a violation date on which the ratio falls below the threshold, and reducing expenses for a present planning period by advancing one or more projects classified as low priority past the predetermined date to the next planning period, thereby preventing the ratio from falling below the threshold.

16. The method of claim 12, further comprising generating one or more corrective alternatives if the ratio falls below the threshold, presenting the corrective alternatives to a user, and implementing those of the corrective alternatives that are selected by the user.

17. The method of claim 12, further comprising generating one or more corrective alternatives if the ratio falls below the threshold, autonomously without direction from a user implementing the corrective alternatives, and notifying the user of implemented corrective alternatives.

18. The method of claim 12, wherein the predetermined date is the last date of a fiscal planning period.

19. The method of claim 12, further comprising generating a coded report having a first code and a second code; wherein the first code indicates that the ratio exceeds the threshold, and wherein the second code indicates that the threshold is equal to or exceeds the ratio.

20. A method for capital expenditure/expense flip targeting and balancing in software pipeline management, the method comprising the computer implemented steps of:
receiving, at a processor, for each of multiple projects in a software project pipeline, a set of inputs that includes 1) resource demand, 2) budget constraint, 3) start date, and 4) a capital expenditure/expense flip date, wherein the capital expenditure/expense flip date comprises a date at which an expense involved in a corresponding project is converted into a capital expenditure;
aggregating, with a processor, the inputs;
calculating, with a processor, an overall capital expenditure/expense ratio;

comparing, with a processor, the ratio to a threshold as of a predetermined date; and applying a spreading algorithm that generates project timing for the projects in the software pipeline such that the overall capital expenditure/expense ratio equals a target as of the predetermined date.

\* \* \* \* \*